United States Patent Office 3,326,384
Patented June 20, 1967

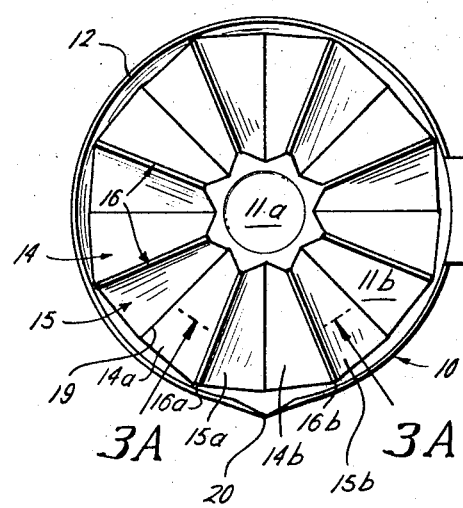
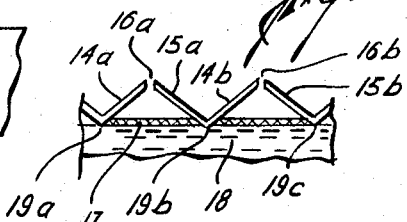
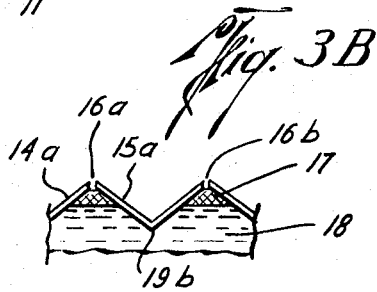
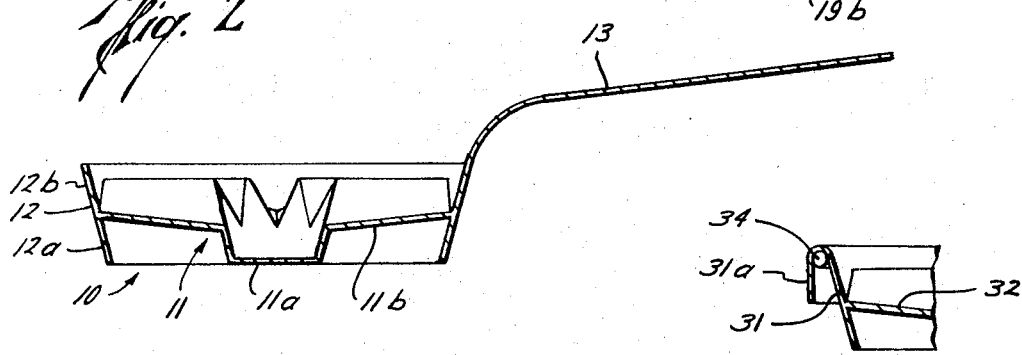
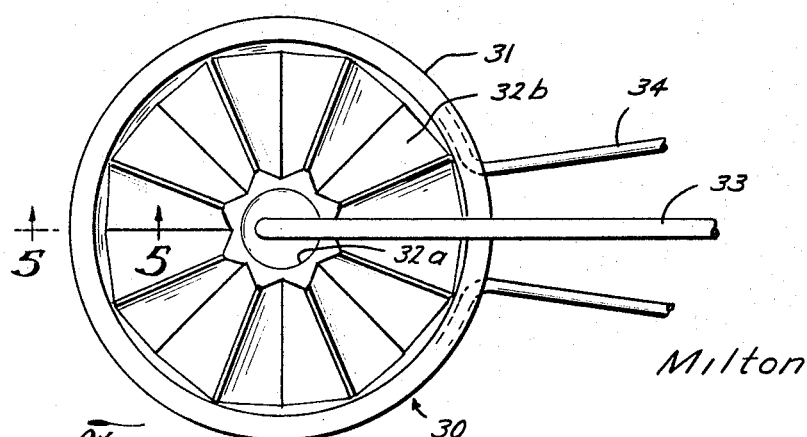
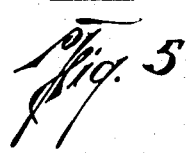
Milton A. Wessels
INVENTOR.

3,326,384
SKIMMER
Milton A. Wessels, 10322 Moorberry,
Houston, Tex. 77043
Filed June 11, 1964, Ser. No. 374,315
3 Claims. (Cl. 210—470)

This invention relates to a skimmer for removing a liquid from the surface of another where the liquids are of different densities and at least partially stratified in the vessel which contains them.

Skimmers of this type are useful for removing any liquid from the surface of another, however, they have particular utility in the kitchen where it is frequently necessary to remove the relatively thin layers of grease and fats which collect on the surface of soups, broths, stews, etc., while they are being cooked. These layers of grease and fat are commonly removed by skimming them from the surface of the main body of liquid with a conventional spoon or ladle. The spoon or ladle is either turned edgewise to dip the grease layer from the surface of the main body of liquid or its bowl-shaped bottom is forced downwardly into the main body of liquid until the upper layer of grease flows over the edge of the spoon into the spoon itself.

Other apparatus for removing a grease layer is shown in my copending patent application Ser. No. 323,038, which was filed Nov. 12, 1963, entitled, "Skimmer," now Patent No. 3,284,349. With this apparatus, a cup-shaped member is provided to collect the grease from which it it pumped into a container. The device can be held and operated by one hand. The grease collecting cup has perforations in horizontal plane around its upper edge and it is forced into the main body of liquid until the grease runs into the cup through the perforations.

Thus, whether using a spoon or the skimmer disclosed in the above-mentioned patent application to skim one liquid from the surface of another efficiently, great care must be exercised to hold the spoon or collecting cup at the proper level in the liquid with a minimum of vertical movement. It is, of course, very difficult for the human hand to hold anything without movement, therefore it is an object of this invention to provide a skimmer which requires movement to function efficiently.

It is another object of this invention to provide a skimmer which employs a vertical movement to skim one liquid from the surface of another.

It is another object of this invention to provide a hand-held skimmer which can efficiently skim an unusually thin layer of liquid from the surface of another while removing an insignificant amount of the liquid being skimmed.

It is another object of this invention to provide a skimmer which employs one of the natural motions imparted to a skimmer when it is held in the hand.

These and other objects and advantages of this invention will be apparent to those skilled in the art from a consideration of this specification, appended claims, and attached drawings.

These objects are obtained in accordance with this invention by providing a generally cup-shaped skimmer having a bottom which slopes upwardly and which is provided with an opening above its lowermost portion. In other words, as opposed to the skimmers described above, with the skimmer of this invention the liquid being removed enters the skimmer through an opening in its bottom as the skimmer is forced downwardly into the liquid. By providing the skimmer with a portion encircling and extending downwardly below the opening in its bottom, as the skimmer is pushed into the liquid a portion thereof will be trapped by the downwardly extending portion.

Then as the skimmer is moved downwardly further into the liquid, the top layer of the trapped liquid will be forced through the opening into the skimmer. If the opening is at the highest point in the bottom, which would usually be the apex formed by the upwardly sloping portions of the bottom, and is small relative to the area of the bottom, the top layer of liquid can be removed very efficiently, i.e., with only a very small percentage of the removed liquid consisting of the liquid being skimmed. For as the skimmer is moved vertically downward, forcing the liquid toward the apex in the bottom, the top layer of liquid will increase in thickness, until it is flowing through the opening into the cup itself. Then as soon as the liquid being skimmed starts through the opening, the downward movement of the skimmer can be stopped thereby removing only an extremely small amount of it while obtaining relatively 100% removal of the liquid on the area of its surface which was encompassed by the skimmer.

The invention will now be described in detail in connection with the attached drawings in which FIG. 1 shows a top plan view of one embodiment of this invention which is provided with a handle for hand operation;

FIG. 2 is a vertical cross-sectional view taken through the embodiment of FIG. 1;

FIG. 3a and 3b are views taken along line 3—3 of FIG. 1 showing the configuration of the bottom of the embodiment of the invention shown in FIG. 1 and also illustrating the two positions of the skimmer relative to the liquid being skimmed to show how the layer of liquid being removed increases in thickness as the skimmer is moved downward into the liquid being skimmed;

FIG. 4 is a top plan view of an alternate device of the invention arranged for use with the skimmer of the aforementioned patent application; and FIG. 5 is a partial, sectional, view taken along line 5—5 of FIG. 4.

The embodiment shown in FIGS. 1, 2, 3a, and 3b of the drawings comprises a cup-shaped member, generally indicated by the number 10, having a bottom 11, encircled by side wall 12 to which is attached handle 13. In accordance with this invention, the bottom of the skimmer is provided with upwardly sloping portions which converge in at least one apex with an opening located at the apex.

In the embodiment shown in FIGS. 1 through 3, bottom 11 has a central cup-shaped portion 11a and a corrugated portion 11b encircling the cup-shaped portion and extending to wall 12. The central cup-shaped portion 11a of bottom 11 is provided to collect the skimmed liquid so that a considerable quantity can be skimmed before having to empty the skimmer.

Corrugated portion 11b of bottom 11 comprises a plurality of uniformally shaped corrugations which provides a plurality of pairs of upwardly inclined converging sides, generally indicated by the numbers 14 and 15 which combine to provide a plurality of apexes, generally indicated by the number 16. Thus, as shown in FIG. 3, sides 14a and 15a converge upwardly to apex 16a. While the next adjacent pair of upwardly sloping sides, 14b and 15b, provides apex 16b. Each pair of sides 14 and 15 are arranged to intersect along a line extending radially between center cup section 11a of the bottom and side 12. Thus, apexes 16 extend radially also from the center section of the bottom. Preferably, the apexes all lie in the same plane which is horizontal with respect to the position the skimmer will assume in use so that fluid will reach the apex of each corrugation at about the same time.

As shown in FIG. 3, each apex is provided with an opening which extends substantially its entire length through which liquid can flow into the cup. In operation, skimmer 10 is located on the surface of the liquids in the manner shown in FIG. 3a. For convenience in referring to the two separate liquids which will be discussed in the description of the operation of the invention, the liquid to be removed indicated by the number 17 will be referred to as "grease," and the liquid to be skimmed will be referred to as "soup." It is to be understood, of course, that the names of any other two liquids having different densities could have been used. The soup is generally indicated by number 18. Thus in FIG. 3a, skimmer 12 is shown as it first engages the surface of the liquids. The lower portions of the corrugations generally indicated by the number 19, have just penetrated the grease layer on the surface of the soup. As shown in the drawing, at this point the grease layer is relatively thin being approximately equal to the thickness to which it has accumulated on the surface of the soup. Then by forcing the skimmer downwardly into the soup, while maintaining it generally horizontal, the portions of the grease and soup between the lower portions 19 of the corrugations will be trapped between the upwardly inclined converging side walls of the corrugations and channeled toward the opening in apex 16. As the skimmer moves downwardly into the soup, as shown in FIG. 3, the grease layer will be compressed between the converging side walls increasing its thickness. Thus, at the point just before the grease starts flowing through the openings in the apexes of the corrugation, it will be considerably thicker than it was on the surface of the soup. Further downward movement of the skimmer will cause grease 17 to flow through the openings in the apexes of the corrugations and down the upper sides of the inclined surfaces in bottom 11 where it is collected in between the upwardly sloping sides of the section and in cup-shaped portion 11a. The downward movement of the skimmer can continue until the soup appears through the openings in the apexes of the corrugations. Then the downward movement of the skimmer can be stopped and the skimmer lifted from the surface of the soup to be placed on another portion of its surface to remove additional grease.

The particular surface area which was enclosed by the downwardly extending side 12 of the skimmer will have been completely skimmed of grease when the soup begins to flow through the openings in the apexes. However, since the openings in the apexes are relatively small, the amount of soup that may appear or need to flow through these openings to indicate that the surface has been completely skimmed is only a very small portion of the total volume of grease that has been removed. This process can be repeated as required to keep the grease on the surface of the soup to a minimum.

During the skimming operation, it may be necessary to periodically pour out the grease which has accumulated in the skimmer. For this purpose side wall 12 is provided with a pouring spout 20.

For efficient operation of the skimmer the portion of the liquid engaged between the lower apexes 19 of the corrugations when the skimmer initially engages the surface of the liquid should be confined between the side walls of the corrugations as the skimmer is moved downwardly into the body of the soup. Otherwise the lighter liquid on top, the grease in this instance, would tend to escape by flowing laterally from or out from under the skimmer thus greatly reducing the efficiency of the device. For this reason, the side wall preferably completely encircles the corrugated section of the bottom. In the embodiment shown, side wall 12 has two portions 12a and 12b. Portion 12a extends downwardly from the lower edge of the corrugated section of the bottom to allow for error in the position of the skimmer when it first engages the soup. In other words, by extending wall 12 downwardly well below the corrugations, the skimmer doesn't have to be exactly horizontal and parallel with the surface of the soup when it makes its initial engagement. Further by extending the wall well below the corrugated bottom, a small change can occur in the angle the skimmer makes with the soup as it is moved downwardly without allowing the grease trapped between the sides to escape.

Upper portion 12b of the side wall extends above upper apexes 16 of the corrugations to prevent liquid from spilling over into the skimmer when the skimmer is in its lowermost position. In other words, if the wall stopped short below the level of the upper apexes 16, then before the liquid trapped between the sides of the corrugations could be forced through the openings in the apexes, liquid would pour over into the skimmer from the outside thus defeating its purpose.

FIGURES 4 and 5 illustrate an alternate embodiment of the invention which is arranged for use with the skimmer shown in my aforesaid application. This skimmer, generally indicated by the number 30, also has a side wall portion 31 and a bottom 32. As was the case in the embodiment described above, bottom 32 is provided with a central cup-shaped portion 32a and a corrugated portion 32b which encircles the central cup-shaped portion and extends radially to side wall 31. Corrugated sections 32b and central section 32a of the bottom are shaped in the same manner as the bottom of the embodiment described above. Therefore, no further description will be presented here.

As shown in FIG. 4, a disposable tube 33 extends into the cup-shaped portion 32a of the bottom to remove the liquid collected therein. The skimmer 30 is attached to the means, which pumps the collected liquid to another container (not shown) through tube 33, by means of wire 34 which encircles the outer wall 31 of the skimmer and is located in the annular space provided by bending down portion 31a of the wall in the manner shown in FIG. 5. Slots (not shown) are provided in the outer portion 31a of the wall to allow the wire 33 to encircle the major portion of the skimmer and then extend to the pump means to which it is attached.

This embodiment of the invention operates in the same manner as the embodiment described above in connection with FIGS. 1–3.

What is claimed is:

1. A skimmer for removing a less dense liquid from the surface of another more dense liquid comprising a cup-shaped member having a bottom and a side wall encircling the bottom, said bottom having a corrugated portion, said corrugated portion having a plurality of pairs of upwardly inclined converging sides that form a plurality of apexes of equal height, each of said apexes having an opening to allow the less dense liquid to flow through the openings to be collected between the corrugations as the skimmer is forced into the liquid with the bottom generally horizontal, said bottom having a central portion below the corrugations to receive the liquid collected between the corrugations, said cup member being further characterized in that the side wall extends above the corrugated portion of the bottom to confine the liquid within the side wall as the bottom of the skimmer is forced below the surface level of the liquid to force the liquid adjacent the surface to flow through the openings in the apexes of the corrugations and to keep the liquid from flowing over the upper edge of the side wall before the less dense liquid confined within the side wall has passed through the openings in the corrugations.

2. A skimmer for removing a less dense liquid from the surface of another more dense liquid comprising a cup-shaped member having a bottom and a side wall encircling the bottom, said bottom having a central cup-shaped portion and a corrugated portion encircling the central cup-portion and sloping upwardly therefrom, said corrugated portion having a plurality of pairs of upwardly inclined converging sides that form a plurality of elongated apexes that extend radially from the central cup portion and which are equally spaced above the cup portion, each of said apexes having an opening along substantially its entire length to allow the less dense liquid to flow through the openings to be collected between the corrugations and in the central cup portion of the bottom as the skimmer is forced into the liquid with the bottom generally horizontal, said cup member being further characterized in that the side wall extends below and above the corrugated portion of the bottom to confine the liquid within the side wall as the bottom of the skimmer is forced below the surface level of the liquid to force the liquid adjacent the surface to flow through the openings in the apexes of the corrugations and to keep the liquid from flowing over the upper edge of the side wall before the less dense liquid confined within the side wall has passed through the openings in the corrugations.

3. The skimmer of claim 2 in which the side wall extends below the central cup-shaped portion of the bottom.

References Cited
UNITED STATES PATENTS

| | | | |
|---|---|---|---|
| 858,291 | 6/1907 | Irby | 210—470 |
| 1,048,546 | 12/1912 | Ketcham | 210—470 |
| 2,143,782 | 1/1939 | Lewy | 210—470 |

REUBEN FRIEDMAN, *Primary Examiner.*

SAMIH N. ZAHARNA, C. DITLOW,
*Assistant Examiners.*